US007903690B2

(12) United States Patent
Wakid

(10) Patent No.: US 7,903,690 B2
(45) Date of Patent: *Mar. 8, 2011

(54) METHOD AND SYSTEM OF SENDING AN AUDIO STREAM AND A DATA STREAM

(75) Inventor: Shukri A. Wakid, Gaithersburg, MD (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1635 days.

This patent is subject to a terminal disclaimer.

(21) Appl. No.: 11/117,164

(22) Filed: Apr. 28, 2005

(65) Prior Publication Data

US 2006/0245451 A1   Nov. 2, 2006

(51) Int. Cl.
*H04J 3/24* (2006.01)
(52) U.S. Cl. .................... 370/474; 370/412; 370/468
(58) Field of Classification Search .................. None
See application file for complete search history.

(56) References Cited

U.S. PATENT DOCUMENTS

| | | | | |
|---|---|---|---|---|
| 6,275,502 | B1 * | 8/2001 | Arimilli | 370/468 |
| 6,795,406 | B2 * | 9/2004 | Kikinis | 370/286 |
| 7,333,512 | B2 * | 2/2008 | Kumar et al. | 370/473 |
| 7,339,893 | B2 * | 3/2008 | Regal et al. | 370/235 |
| 7,436,844 | B2 * | 10/2008 | Wang et al. | 370/412 |
| 2002/0075852 | A1 | 6/2002 | Priess | |
| 2002/0077251 | A1 | 6/2002 | Okusako | |
| 2003/0217318 | A1 | 11/2003 | Choi | |
| 2004/0092278 | A1 | 5/2004 | Diepstraten et al. | |
| 2004/0177247 | A1 * | 9/2004 | Peles | 713/155 |
| 2004/0228351 | A1 | 11/2004 | Richter et al. | |
| 2005/0036472 | A1 | 2/2005 | Kikinis | |
| 2005/0063388 | A1 * | 3/2005 | Stacey et al. | 370/395.1 |
| 2005/0072720 | A1 | 4/2005 | Sutera | |
| 2005/0129028 | A1 * | 6/2005 | Peeters et al. | 370/395.21 |
| 2005/0169172 | A1 * | 8/2005 | Wang et al. | 370/229 |
| 2005/0175013 | A1 * | 8/2005 | Le Pennec et al. | 370/395.42 |
| 2005/0195821 | A1 * | 9/2005 | Yun et al. | 370/392 |
| 2006/0112168 | A1 * | 5/2006 | Albers et al. | 709/213 |

FOREIGN PATENT DOCUMENTS

WO       2004045120       5/2004

OTHER PUBLICATIONS

S. Buckingham, "What is General Packet Radio Service," Copyright 2000 Mobile Lifestreams Ltd., 23 pp. [Online] http://www.gsmworld.com/technology/gprs/intro.shtml.
"General Packet Radio Service," Wikipedia, last updatedJan. 13, 2005, 3 pp. [Online] http://en.wikipedia.org/wiki/GPRS.

* cited by examiner

*Primary Examiner* — Seema S Rao
*Assistant Examiner* — Rhonda Murphy

(57) ABSTRACT

A method and system of sending an audio stream and a data stream over a data network. Some of the illustrative embodiments may be a method comprising sending an audio stream using a data network of a wireless telephone system; and sending a data stream across the data network.

15 Claims, 3 Drawing Sheets

US 7,903,690 B2

METHOD AND SYSTEM OF SENDING AN AUDIO STREAM AND A DATA STREAM

BACKGROUND

There has recently been a convergence of functionality between cellular telephones and handheld devices sometimes called personal digital assistants (PDAs). The convergent devices thus give rise to voice and data services, which have differing quality-of-service requirements. To handle simultaneous voice and data services, hardware providers make devices that are, from an external viewpoint, integrated devices. Internally, however, independent systems exist to handle the voice and data services. For example, cellular telephone circuitry handles non-packet-based voice services, while independent computing functionality provide packet-based data services. Even though the wireless access technology, such as General Packet Radio Service (GPRS) and/or Code Division Multiple Access (CDMA) could be the same for a given device, the internal segregation does not enable sharing of resources and presents problems for isochronous services.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an electrical connection via other devices and connections.

DETAILED DESCRIPTION

Figure 1:
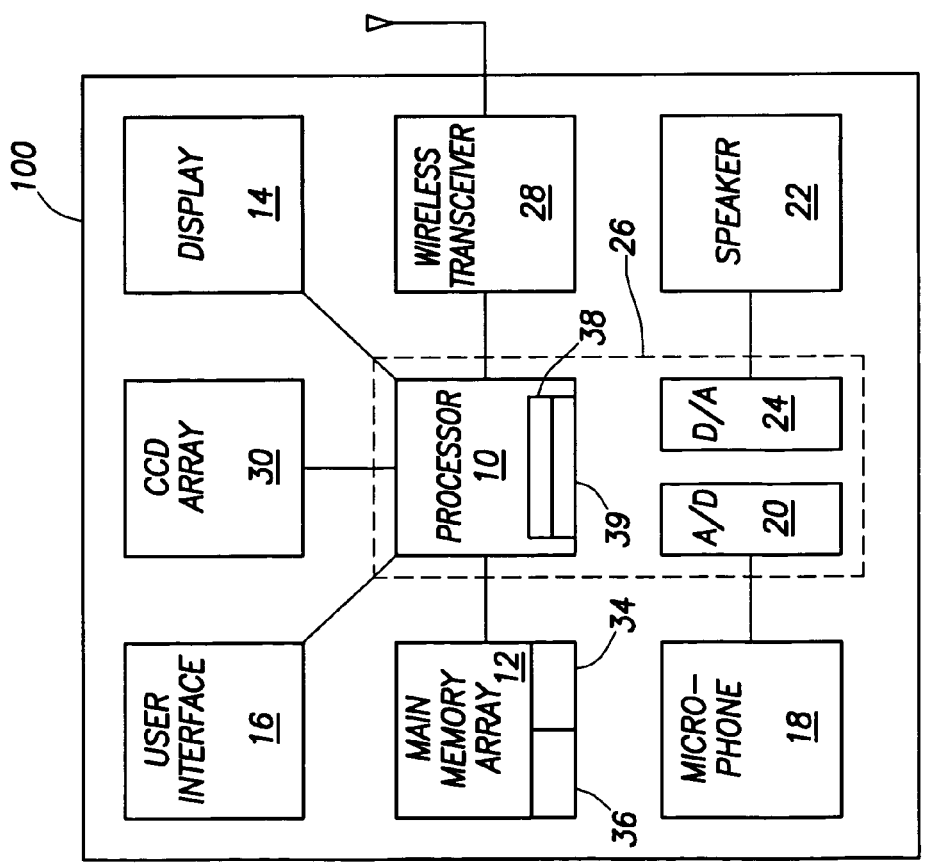
FIG. 1 shows a portable computing system in accordance with embodiments of the invention.

FIG. 1 shows a portable computing device 100 in accordance with at least some embodiments of the invention. Portable computing device 100 incorporates into a single device functionality of one or more of a cellular telephone, a personal digital assistant (PDA), or a still and/or motion video camera. To implement this functionality, portable computing device 100 comprises a processor 10 coupled to a main memory array 12. The main memory array 12 comprises one or more random access memory (RAM) devices. The main memory array 12 is the working memory for the processor 10, and thus stores programs and data utilized by the processor 10. In order to provide the various types of functionality, processor 10 executes one or more programs, which may be stored permanently or semi-permanently in the main memory array 12.

Portable computing device 100 also comprises a display 14 coupled to the processor 10. The display 14 is any suitable device that can display text and/or data for a user, such a liquid crystal display (LCD). The portable computing device 100 further comprises a user interface 16 coupled to the processor 10. In some embodiments, the user interface 16 is a full- or reduced-size keyboard. In alternative embodiments, the user interface 16 is a keypad comprising at least the ten numeric digits. In yet further alternative embodiments, the user interface is a digitizer panel that overlays the display 14, thus enabling a user to interface with programs on the processor using a writing stylus. In yet still other embodiments, the user interface may be a combination of two or more of the various types of interfaces described. Processor 10, executing a program, may thus provide a user of the portable computing device 100 services such as calendars, task scheduling, address book services, word processing, online banking, and file transfers.

Still referring to FIG. 1, portable computing device 100 further comprises a microphone 18 coupled to the processor 10 by way of an analog-to-digital converter 20. Likewise, speaker 22 couples to the processor 10 by way of digital-to-analog converter 24. Spoken voices and/or other audio sounds are detected by the microphone 18 and converted into digital form by the analog-to-digital converter 20. Processor 10, executing a program, encodes the detected audio using any suitable encoding scheme, such as Code Excited Linear Prediction (CELP). Likewise, processor 10 may receive encoded audio, convert the encoded audio into an unencoded digital format, apply the unencoded digital format audio to the digital-to-analog converter 24, thus reproducing the audio by way of speaker 22. Processor 10, analog-to-digital converter 20 and digital-to-analog converter 24 may be individual components coupled together to perform the various tasks, or the functionality of the processor, analog-to-digital converter and digital-to-analog converter may be contained in a single device, as illustrated by dashed line 26, such as a dedicated digital signal processor.

In the illustrated embodiments, the portable computing device 100 further comprises a wireless transceiver 28 coupled to the processor 10. The wireless transceiver 28 is responsible for wireless communication of audio, video and/or data. The wireless transceiver 28, microphone 18, speaker 22 and software executing on the processor 10 may thus provide wireless telephone services, for example. In some embodiments, the wireless transceiver 28 implements General Packet Radio Service (GPRS). GPRS is a data exchange service that enables data to be sent and received within a mobile telephone network. Embodiments of the invention, however, also use the illustrative GPRS to provide audio services, such as wireless telephone services, as described more fully below. A transceiver 28 implementing GPRS is merely illustrative, and other long- or short-haul data communication systems may be equivalently used. For example, in alternative embodiments the wireless transceiver 28 implements the Institute of Electrical and Electronics Engineers (IEEE) 802.11 wireless networking protocol.

Still referring to FIG. 1, portable computing device 100 further provides digital camera functionality, and thus comprise a charge-coupled device (CCD) array 30 coupled to the processor 10. Processor 10, executing a program, utilizes the CCD array 30 to capture still images and/or a series of still images to capture motion video. Moreover, using microphone 18, the processor 10 may also capture audio that accompanies the motion video. Some of these elements may be omitted without departing from the scope and spirit of the invention.

The audio aspects of the computing device 100 produce an audio stream. Likewise, the camera aspects of the portable computing device 100 produce a video stream. Quality-of-service for audio and video streams is not severely impacted by an occasional lost packet, but excessive transmission delays may severely impact quality-of-service. For this reason, a portable computing device 100 in accordance with at least some embodiments of the invention sends the audio stream, whether telephone based or part of motion video, using Universal Datagram Protocol (UDP) as the transmission layer protocol. Likewise when present, a video stream is sent using UDP as the transmission layer protocol. UDP does not inherently provide assurance of delivery of each packet (no acknowledgment of data packet receipt, or automatic or triggered resends of data packets) which therefore lowers overall network overhead for an audio and/or video stream which does not need such capabilities. In accordance with at least some embodiments of the invention, the video stream is encoded prior to network transmission using the Moving Pictures Expert Group (MPEG) II encoding scheme.

A user of the portable computing device 100 may also generate a low bandwidth data streams comprising online transactions (e.g., online banking, online bill paying or online purchases), electronic mail messages, and requests for web services. Because quality-of-service for these low bandwidth data streams is severely impacted by loss of data packets, but not by reasonable transmission delay, in accordance with at least some embodiments the low bandwidth data streams are transmitted using Transmission Control Protocol (TCP) as the transmission layer protocol. TCP implementations ensure delivery using receiver acknowledgments, automatic resends on time out, and receiver-triggered resends of data (such as when data corruption occurs during transmission). Further, a user of portable computing device 100 may generate high bandwidth data streams in the form of the transfer of relatively large electronic files, e.g., word processing files and database files. Much like online transaction and electronic mail messages, quality-of-service for high bandwidth data streams is severely impacted by loss of data packets, but not by reasonable transmission delays. Thus, in accordance with at least some embodiments, these high bandwidth data streams also use TCP as the transmission layer protocol.

Various embodiments of the invention are also directed to processor-based methods, and related systems, for prioritizing transmission of the audio/video and data streams to ensure that, to the extent possible based on bandwidth, each of the streams is sent with sufficient frequency to reduce quality-of-service issues. Referring again to FIG. 1, the main memory array 12 comprises a high priority buffer 34 and a low priority buffer 36. High priority buffer 34 is used to accumulate high priority packets, such as audio and/or video stream packets using UDP as the transmission layer protocol (hereinafter UDP datagrams, a datagram being a packet-based message). At the earlier of expiration of a timer or the payload of the UDP datagram becoming full, the UDP datagram is completed by filling in various portions of a header, e.g., destination, the total length and header checksum. The process of completing the header may alternatively be referred to as "sealing" the datagram. Once sealed, the datagram is ready for transmission. Likewise, the low priority buffer accumulates payload for low priority data packets, such as high and low bandwidth data stream packets possibly using TCP as the transmission layer protocol (hereinafter TCP datagrams). When the available transmission bandwidth is not filled by UDP datagrams, the TCP datagrams are transmitted. Thus, and in accordance with embodiments of the invention, UDP datagrams are given priority over TCP datagrams.

Transmitting sealed datagrams may involve moving datagrams from the buffers 34 and 36 in the main memory array 12 to a network interface device (device driver), such as wireless transceiver 28. However, network congestion and/or speed of the network connection may limit how fast the wireless transceiver 28 can consume datagrams for transmission, and thus the buffers in the main memory array 12, especially the low priority buffer 36, may accumulate several datagrams for network transmission. In order to keep track the state of utilization of each of the buffers 34 and 36, embodiments of the invention utilize a register or set of registers, e.g., registers 38 and 39 of processor 10. These registers may implement timers, and counters for filled buffer cells, thus enabling calculation of buffer input flow rates, as discussed more below. In accordance with some embodiments, register 38 may be a 72-bit register with a portion, e.g., 8 bits, implementing the timer function, and with two 32-bit portions each of which stores a value indicative of buffer capacity utilization. Likewise, register 39 may be a 72-bit register with a portion, e.g., 8 bits, implementing the timer function, and with two 32-bit portions each of which store a value indicative of buffer capacity utilization. As data is accumulated in buffers 34 and 36 (as memory cells in the buffers are written), the corresponding portions of the register 38 are updated. Likewise, as datagrams are moved to the wireless transceiver 28 for transmission, the space is freed and thus the utilization values in register 38 are adjusted. Register 39, in some embodiments, holds buffer utilization values regarding sealed datagrams, rather than memory cell utilization values held by register 38. Using buffer capacity utilization values from register 38 and 39, and in combination with a timer value, the unsealed datagram fill rate may be determined, as discussed more fully below.

Various embodiments of the invention were developed in the context of using GPRS in mobile telephone networks operated under the Global System for Mobile (GSM) communication standards, and based on time division multiplexing of available bandwidth under the Time Division Demand Multiple Access (TDMA) standards. These various embodiments will be discussed in relation to this developmental context; however, the developmental context is merely illustrative, and other systems and access protocols (e.g., IEEE 802.11, Code Division Multiple Access (CDMA)) may be equivalently used. In a GSM TDMA system, the available transmission bandwidth is time division multiplexed into eight frame periods, with each frame period comprising 4.6 milli-seconds (msecs). The theoretical GPRS transmission rate of 172.2 kilo-bits per second (kpbs) split over the eight frame periods amounts to a 21.5 kbps theoretical bandwidth for each frame period. Considering practical efficiency in transmitting data, approximately 24 to 25 bytes may be transmitted within each frame period. If the Enhanced Data GSM Environment (EDGE) is used, the bandwidth, and therefore the number of bytes that could be sent, approximately doubles. The discussion below assumes that an individual portable computing device 100 is constrained to transmit in one frame period; however, depending on wireless telephone system loading the portable computing device may be assigned one or more of the frame periods.

Figure 2:
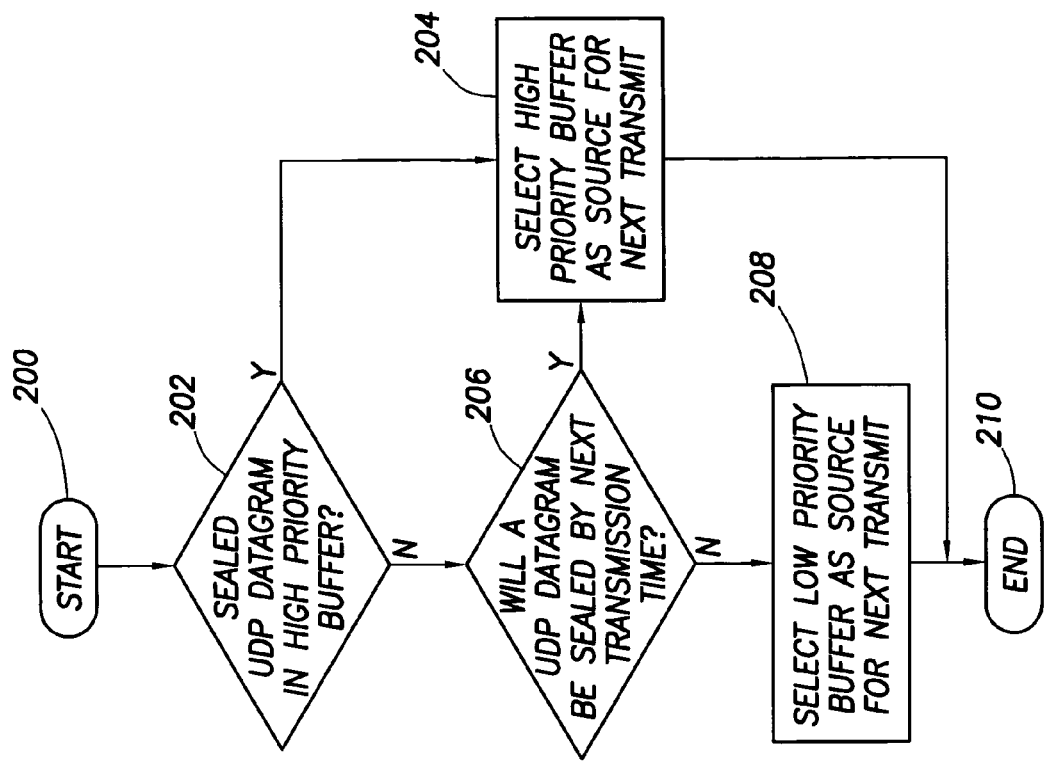
FIG. 2 illustrates a buffer management method in accordance with at least some embodiments of the invention.

FIG. 2 illustrates a buffer management method that may be implemented in accordance with at least some embodiments of the invention. In FIG. 2, or any of the figures of the specification, the order of the various illustrative steps may change, some of the illustrative steps may be combined, and others may be separated, all without departing from the scope and spirit of the invention. The methods may be implemented, for example, by one or more programs executing on processor 10 (FIG. 1). The illustrative buffer management process starts (block 200), and a determination is made as to whether there is a sealed UDP datagram in the high priority buffer (block 202). In accordance with embodiments of the invention, UDP datagrams in the high priority buffer have priority over datagrams in the low priority buffer, and thus if a sealed UDP datagram exists in the high priority buffer, the high priority buffer is selected as the source for the next transmit (block 204). If, on the other hand, there is not a sealed UDP datagram in a high priority buffer (again block 202), a determination is made as to whether there will be a sealed UDP datagram in a high priority buffer by the next transmission time (block 206), the transmission time in some cases being a frame period. The determination of whether a UDP datagram will be sealed by the next transmission time is discussed more fully with respect to FIG. 3 below. Still referring to FIG. 2, if there is neither a sealed UDP packet in the high priority buffer (block 202), nor will there be a sealed UDP packet in the high priority buffer by the next transmission time (block 206), then the low priority buffer is selected as the source for the next transmit (block 208), and the process ends (block 210). The low priority buffer 36, in accordance with at least some embodiments of the invention, is the location for the building and storing after sealing of data streams, such as may be transmitted using TCP as the transmission layer protocol. Although FIG. 2 shows that the illustrative process ends after a selection of either the high priority buffer (block 204) or the low priority buffer (block 208), embodiments of the process may immediately start anew so that by the start of the next transmission time (e.g., frame period) a buffer (and therefore a datagram) have been selected.

Figure 3:
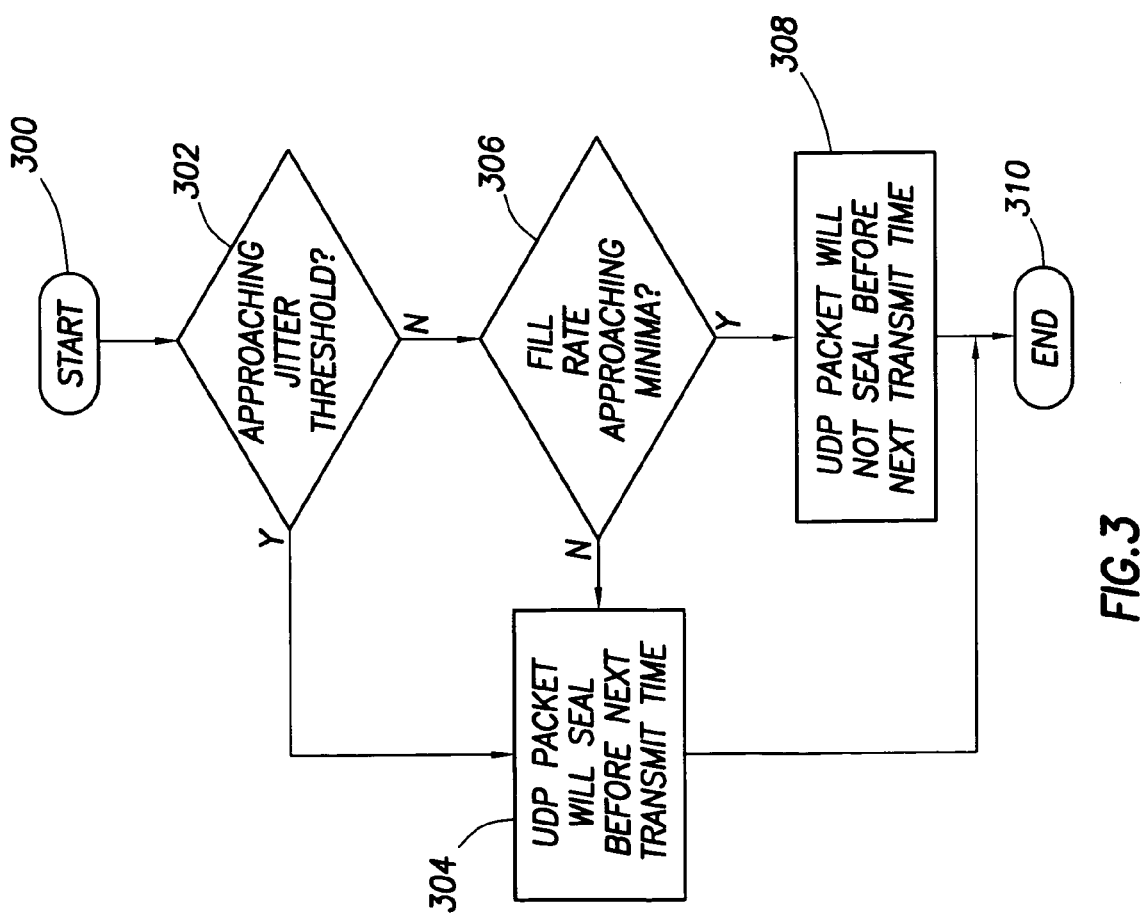
FIG. 3 illustrates a determination of whether a datagram will be sealed by the next transmission time in accordance with embodiments of the invention.

FIG. 3 illustrates, in greater detail, the determination of whether a datagram will be sealed by the next transmission time. There are two time periods of interest with respect to the illustrative method of FIG. 3. The first time period of interest is the time until the start of the next transmission time (e.g., frame period) to which the portable computing device 100 is assigned. For example, with a frame period of 4.6 msec, and eight frame periods, the start of a single assigned frame period begins every 36.8 msec. The start of the next transmission time may be tracked, for example, in the timer portion of register 38 (FIG. 1). The second time period of interest deals with quality-of-service for the audio and/or video stream packets accumulated and sent from the high priority buffer, and this time may be tracked, for example, in the timer portion of register 39 (FIG. 1). With respect to audio streams, audio can be suitably reproduced if packets of the audio stream are sent at least every 100 msecs. As for video streams, the human eye perceives continuous motion so long as the overall frame is updated at least every 40 msecs. This 100 msec time frame for audio streams, and 40 msec time frame for video streams, may be collectively referred to as the jitter threshold. The illustrative time frames may be changed without departing from the scope and spirit of the invention.

The illustrative process starts (block 300), and a determination is made as to whether, for the particular type of stream in the high priority buffer, the system is approaching the jitter threshold (block 302). That is, the determination is whether the illustrative system is approaching, for example, 100 msecs since the last send of an audio-only stream packet, or whether the illustrative system is approaching, for example, 40 msecs since the last send of a video-only or combined video/audio stream packet. In accordance with at least some embodiments of the invention, each time an audio stream packet is transmitted, a timer (e.g., a timer whose value is held in register 39 (FIG. 1)), is armed. The determination of illustrative block 302 may thus be made by reference to the timer. If the jitter threshold is approaching, regardless of whether the unsealed UDP datagram has a full payload, that UDP datagram is sealed before the transmit time (block 304), therefore keeping transmission within the jitter threshold. If, on the other hand, the system is not approaching the jitter threshold (again block 302), a determination is made as to whether the fill rate of the unsealed datagram in the high priority buffer is approaching a minima (block 306). That is to say, and for an illustrative audio stream, if the datagram under construction will neither seal because the jitter threshold is approaching nor seal because the packet payload is full, then the illustrative UDP datagram will not seal before the next transmit time (block 308), and the process ends (block 310). If, on the other hand, the fill rate is not approaching a minima, this implies that the full 24 to 25 bytes of the illustrative UDP datagram will be present before the next transmit time, and thus the UDP datagram will seal and be available before the next transmit time (again block 304).

Determining the fill rate of the illustrative UDP datagrams in the high priority buffer, in illustrative embodiments, involves the use of the registers 38 and 39 (FIG. 1). In particular, register 38 has two value portions: a high priority buffer capacity utilization value; and a low priority buffer capacity utilization value. In accordance with embodiments of the invention, each time a byte of data is placed in either of the high or low priority buffers, the respective buffer capacity utilization value in the register 38 is updated. Thus, as an unsealed datagram is being filled, the buffer capacity utilization values in register 38 reflect the instantaneous buffer capacity utilization. Likewise, portions of register 39 contain buffer capacity utilization values; however, and in accordance with at least some embodiments of the invention, the buffer capacity utilization values in register 39 reflect the buffer capacity utilization for sealed datagrams only. By comparing the difference in the buffer capacity utilization values as between register 38 and register 39, and with the corresponding time factor, the fill rate of an unsealed datagram may be determined. If the jitter threshold for the particular type of UDP datagram is not approaching (for example, 100 msecs for audio streams and 40 msecs for video or combined video/audio streams), and the illustrative UDP datagram will not have a full payload by the start of the next frame period, then other datagrams, e.g a TCP datagram from the low priority buffer, may be selected for transmission. Thus, audio and video streams, whose illustrative UDP datagrams are created in the high priority buffer, are given the highest priority for transmission in accordance with embodiments of the invention. The data streams, e.g., TCP based datagrams, are sent only when no sealed datagram will be available in the high priority buffer at the next allotted transmission time. Thus, if a packet-based message is "not available," that unavailability may be because either there is no packet-based message under construction, or if under construction, a jitter threshold is not approaching that would dictate sealing the packet-based message.

The illustrative portable computing device 100 may use the buffer management techniques described with respect to FIGS. 2 and 3 in networks where all communications move through wireless network base stations. Stated otherwise, a first portable computing device 100 may communicate with a similar portable computing device by transmitting the audio/video and/or data streams through the base station to the wireless network system, and in turn the wireless network system forwarding the streams to the target device. In alternative embodiments of the invention, the portable computing device 100 may be part of an ad-hoc network where communications move between portable computing devices directly. For example, an illustrative device 100 may have the capability of online gaming, and by discovering similar devices in close proximity, a plurality of users may participate in online gaming with the data exchange for the online gaming not necessarily moving through the wireless network base station.

However, the quality of communication possible between multiple devices in an ad-hoc network may vary greatly. Devices within a few feet of each other may have sufficient communication quality to perform substantially any task. Other devices, while still part of the ad-hoc network, may be of sufficient distance that the communication quality between the two devices is diminished.

Figure 4:
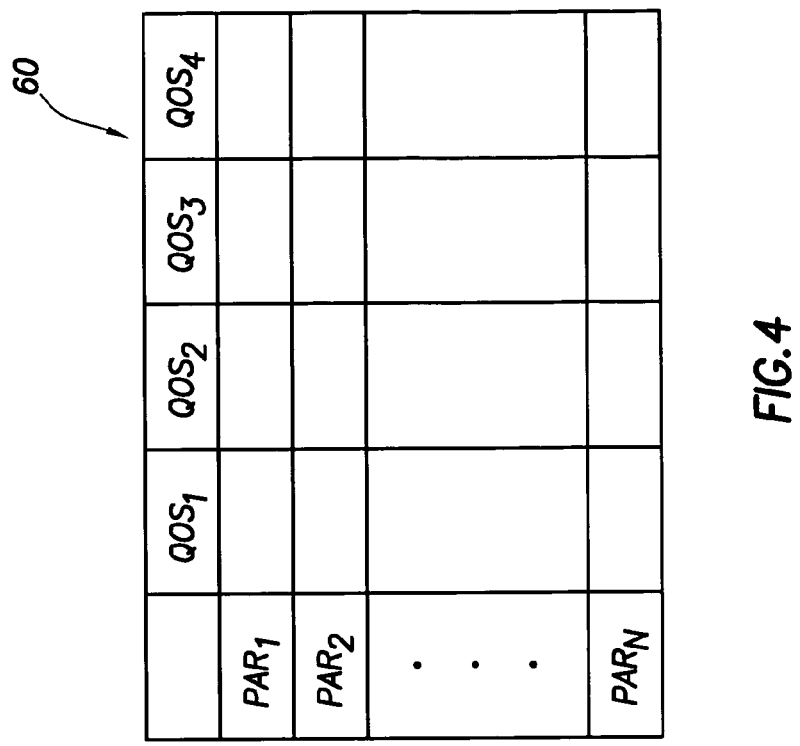
FIG. 4 illustrates a management table in accordance with embodiments of the invention.

In accordance with embodiments of the invention, a portable computing device 100 that initiates an ad-hoc network creates and maintains a management table that holds the communication status of the links to each of the participants in the ad-hoc network. FIG. 4 illustrates embodiments of a management table 60 that may be used. The management table 60 may be created at any convenient location in the portable computing device 100, such as in the main memory array 12. In embodiments using GPRS as the mechanism to transmit the various streams, each participant ($PAR_x$) may have an entry followed by four locations to note the quality-of-service to that participant. It is noted that management table 60 is merely illustrative, and any management table that notes the existence of a participant and the quality-of-service available to that participant is within the scope and spirit of the invention. In an illustrative system using GPRS, there are four levels of service, hence the four entries in the management table 60 for quality-of-service ($QOS_x$). The highest quality-of-service ($QOS_1$) is representative of a situation where the quality-of-service to a particular participant is not limited. Likewise, the quality-of-service to any participant may also degrade to the point where no services, or very minimal services, are possible ($QOS_4$). The qualities-of-service between these two extremes ($QOS_2$ and $QOS_3$) invoke different actions, as discussed more fully below.

Figure 5:
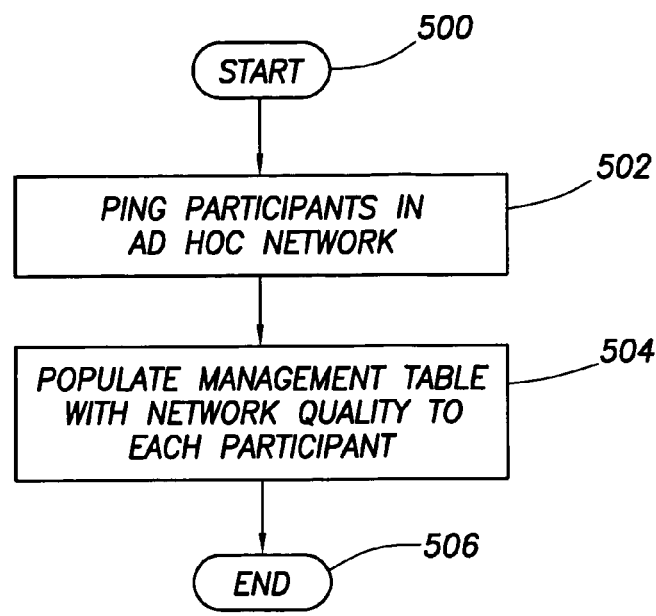
FIG. 5 illustrates a method of populating a management table in accordance with embodiments of the invention.

FIG. 5 illustrates a method of determining the quality-of-service to each participant in the ad-hoc network, and populating the illustrative management table 60. In particular, the method starts (block 500) and the primary portable computing device sends a "ping" command to each participant in the ad-hoc network (block 502). A ping command to any participant invokes a response from that participant, and the primary portable computing device may discern the quality-of-service to the particular participant based on parameters such as the round trip time of the ping/response, and whether the small bit of data that accompanied the ping experienced any corruption in the round trip path. Based on this data, the illustrative method of FIG. 5 populates the management table with a network quality indication for each participant (block 504). Thereafter the process ends (block 506). However, in accordance with embodiments of the invention, the illustrative method of FIG. 5 is repeated periodically when an ad-hoc network is in place. Using the data in the management table 60, possibly gathered by the ping command of the illustrative method of FIG. 5, a portable computing device in accordance with embodiments of the invention may take action with respect to communication to particular participants in the ad-hoc network.

Figure 6:
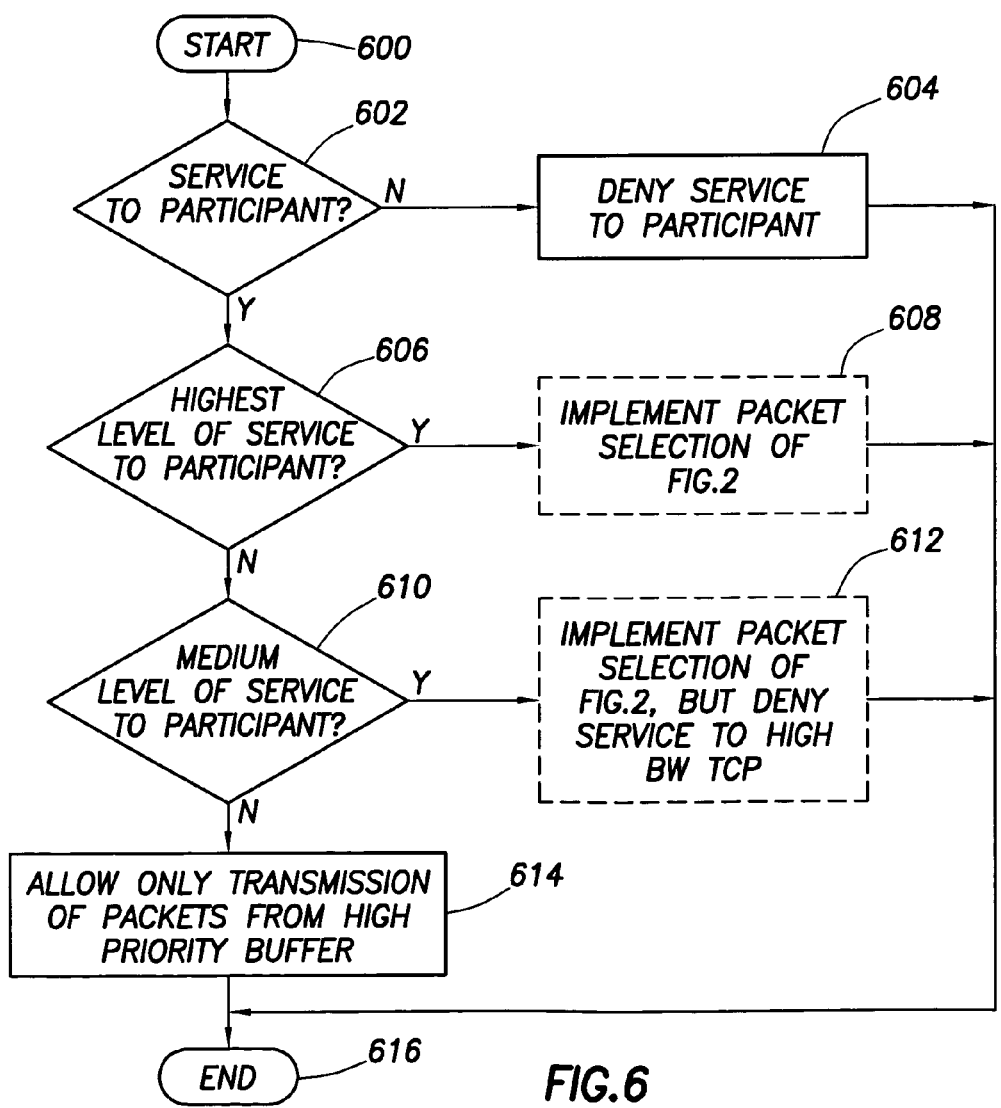
FIG. 6 illustrates a method that may be implemented in accordance with at least some embodiments of the invention.

FIG. 6 illustrates a method that may be implemented in accordance with at least some embodiments of the invention in relation to quality-of-service. In particular, the process starts (block 600), and a determination is made as to whether service is available to a particular ad-hoc network participant (block 602). This may be determined, for example, by reference to the particular participant's entry in illustrative management table 60, and a determination that the lowest quality-of-service ($QOS_4$) is indicated. If the management table indicates that the quality-of-service with respect to communications to the particular participant is the lowest quality-of-service, then a portable computing device in accordance with at least some embodiments denies service to that particular participant (block 604). If, on the other hand, the quality-of-service to the particular participant is of the highest quality ($QOS_1$), again in some embodiments determined by reference to the illustrative management table 60 (block 606), then the system performs the illustrative method steps of FIG. 2 (block 608) without regard to quality-of-service issues.

Still referring to FIG. 6, if the quality-of-service to the particular participant in the ad-hoc network is neither the lowest quality-of-service ($QOS_4$) nor the highest quality-of-service ($QOS_1$), a determination is made as to whether the quality-of-service to the particular participant supports only low bandwidth communications ($QOS_2$) (block 610). If the quality-of-service to the particular participant supports only low bandwidth communications, then the illustrative method of FIG. 2 may still be implemented, except that the illustrative high bandwidth data streams (e.g., file transfers) are denied access to the transmission medium (block 612). Thus, the audio and video streams, as well as the low bandwidth data streams, are allowed access to the transmission medium. If the quality-of-service to the particular participant is somewhere between no service ($QOS_4$) and $QOS_2$, i.e., $QOS_3$, then in accordance with embodiments of the invention a portable computing device only allows transmission of packets from the high priority buffer (block 614). In this situation, only the audio and video streams are allowed access to the transmission medium. Thereafter, the illustrative process ends (block 616).

The buffer management technique described with respect to FIG. 2 may still be implemented in an ad-hoc network with varying quality-of-service to each participant, with modifications to the services allowed based on the quality-of-service to the particular participant, as determined, for example, by the illustrative FIG. 5 and tracked by the illustrative management table 60 of FIG. 4.

From the description provided herein, those skilled in the art are readily able to combine software created as described with appropriate general purpose or a special purpose computer hardware to create a computer system and/or computer subcomponents embodying aspects of the invention, to create a computer system and/or computer subcomponents for carrying out the method embodiments of the invention, and/or to create a computer-readable medium storing a software program to implement method aspects of the various embodiments. Moreover, the embodiments of the illustrative methods could be implemented together in a single program (with various subroutines), or split up into two or more programs executed on the processor. Thus, reference to multiple instances of "a processor, executing a program," in a claim refers to either a single program with multiple subroutines, two or more independent programs, or a combination thereof.

What is claimed is:

1. A portable computing device comprising:
   a processor;
   a wireless transceiver coupled to the processor, the wireless transceiver configured to communicate with other devices in a wireless telephone system data network;
   a memory array coupled to the processor and wireless transceiver, the memory array comprising a high priority buffer and a low priority buffer;
   a management table in the memory array;
   wherein the processor builds datagrams in the high priority buffer, and builds datagrams in the low priority buffer;
   wherein the processor tracks high priority buffer capacity utilization of sealed datagrams in a first register, and tracks total high priority buffer capacity utilization in a second register; and wherein the processor determines a fill rate of an unsealed datagram in the high priority buffer using the first and second registers; and
   wherein the processor maintains the management table which denotes an indication of bandwidth of a link between the portable computing device and a second portable computing device, and wherein the processor selectively limits transmission of datagrams to the second portable computing device based on the indication in the management table.

2. The portable computing device as defined in claim 1 wherein the processor selectively limits transmission of datagrams to only datagrams from the high priority buffer.

3. The portable computing device as defined in claim 1 wherein the processor limits transmission of datagrams to only datagrams from the high priority buffer, and datagrams from the low priority buffer requiring low bandwidth.

4. A portable computing device comprising:
   a processor;
   a wireless transceiver coupled to the processor, the wireless transceiver configured to communicate with other devices in a wireless telephone system data network;
   a memory array coupled to the processor and wireless transceiver, the memory array comprising a high priority buffer and a low priority buffer; and
   a first and second register associated with the processor;
   wherein the processor builds datagrams in the high priority buffer, and builds datagrams in the low priority buffer;
   wherein the processor tracks high priority buffer capacity utilization of sealed datagrams in the first register, and tracks total high priority buffer capacity utilization in the second register; and
   wherein the processor determines a fill rate of an unsealed datagram in the high priority buffer using the first and second registers, and sends a datagram from the low priority buffer to the transceiver for transmission if the unsealed datagram in the high priority buffer will not have a substantially full payload by the next transmission time.

5. The portable computing device as defined in claim 4 wherein the datagrams of the high priority buffer comprise at least one or more of the group comprising: portions of an audio stream; and portions of a video stream.

6. The portable computing device as defined in claim 4 wherein the datagrams of the low priority buffer comprise at least one or more of the group comprising: data of online transactions; electronic mail messages; requests for web services; and portions of files to be transferred.

7. A portable computing device comprising:
   a processor;
   a wireless transceiver coupled to the processor, the wireless transceiver configured to communicate with other devices in a wireless telephone system data network;
   a memory array coupled to the processor and wireless transceiver, the memory array comprising a high priority buffer and a low priority buffer;
   a first and second register associated with the processor;
   wherein the processor builds datagrams in the high priority buffer, and builds datagrams in the low priority buffer;
   wherein the processor tracks high priority buffer capacity utilization of sealed datagrams in a first register, and tracks total high priority buffer capacity utilization in a second register; and
   wherein the processor determines a fill rate of an unsealed datagram in the high priority buffer using the first and second registers;
   wherein the processor tracks in the first register an amount of time since the last send of a datagram from the high priority buffer; and
   wherein the processor seals an unsealed datagram of the high priority buffer and sends the datagram to the transceiver for transmission if the amount of time since the last transmission approaches a predetermined threshold.

8. The portable computing device as defined in claim 7 wherein the datagrams of the high priority buffer comprise at least one or more of the group comprising: portions of an audio stream; and portions of a video stream.

9. The portable computing device as defined in claim 7 wherein the datagrams of the low priority buffer comprise at least one or more of the group comprising: data of online transactions; electronic mail messages; requests for web services; and portions of files to be transferred.

10. A non-transitory computer-readable medium storing a program that, when executed by a processor, causes the processor to:
    build a datagram for transmission in a high priority track high priority buffer capacity utilization of sealed datagrams in a first register, and tack total high priority buffer capacity utilization in a second register;
    build a datagram for transmission in a low priority buffer using the first and second registers;
    determine a fill rate of an unsealed datagram in the high priority buffer;
    select for sending a datagram from the low priority buffer if the unsealed datagram in the high priority buffer will not contain a sufficient number of bytes, based on the fill rate determined, by the next transmission time; and then
    send for transmission across a wireless telephone system data network a datagram from the low priority buffer.

11. The non-transitory computer-readable medium as defined in claim 10 wherein when the processor builds a datagram in the high priority buffer the program further causes the processor to build a datagram of an audio stream in, the high priority buffer.

12. The non-transitory computer-readable medium as defined in claim 10 wherein when the processor builds a datagram in the low priority buffer the program further causes the processor to build a datagram comprising a portion of a data stream in the low priority buffer.

13. The non-transitory computer-readable medium as defined in claim 10 wherein when the processor sends the program further causes the processor to send a datagram of an audio stream across the data network implementing general packet radio service (GPRS).

14. The non-transitory computer-readable medium as defined in claim 10 wherein the program further causes the processor to send a datagram from the high priority buffer using Universal Datagram Protocol (UDP) as the transmission layer protocol (UDP datagram).

15. The non-transitory computer-readable medium as defined in claim 10 wherein the program further causes the processor to send a datagram from the low priority buffer using Transmission Control Protocol (TCP) as the transmission layer protocol (TCP datagram).

* * * * *

UNITED STATES PATENT AND TRADEMARK OFFICE
CERTIFICATE OF CORRECTION

PATENT NO. : 7,903,690 B2
APPLICATION NO. : 11/117164
DATED : March 8, 2011
INVENTOR(S) : Shukri A. Wakid It is certified that error appears in the above-identified patent and that said Letters Patent is hereby corrected as shown below:

In column 10, line 53, in Claim 11, delete "in," and insert -- in --, therefor.

Signed and Sealed this
Twelfth Day of July, 2011

David J. Kappos
*Director of the United States Patent and Trademark Office*